United States Patent [19]  [11] 3,946,109
Kolb  [45] Mar. 23, 1976

[54] ANIMAL FEED COMPOSITION CONTAINING CERTAIN VITAMIN COMBINATIONS

[76] Inventor: Ernst Kolb, Am Rain 612, 4922 Butzberg, Kanton Bern, Switzerland

[22] Filed: Dec. 30, 1974

[21] Appl. No.: 537,346

Related U.S. Application Data

[63] Continuation-in-part of Ser. No. 386,545, Aug. 8, 1973, abandoned, which is a continuation of Ser. No. 42,899, June 2, 1970, abandoned, which is a continuation-in-part of Ser. No. 656,051, July 26, 1967, abandoned.

[52] U.S. Cl. .................. 424/95; 424/284; 424/319; 424/344
[51] Int. Cl.² ............. A61K 35/12; A61K 31/355; A61K 31/195; A61K 31/07
[58] Field of Search ............ 424/284, 344, 95, 319

[56] References Cited
UNITED STATES PATENTS
2,541,447  2/1951  Turner et al. .................... 424/308
2,937,091  5/1960  Rosenberg .......................... 424/36

OTHER PUBLICATIONS
Merck Index, 7th Ed., (1960), p. 1103.

*Primary Examiner*—V. D. Turner
*Attorney, Agent, or Firm*—Toren, McGeady and Stanger

[57] ABSTRACT

The disclosed animal feed comprises a conventional feed mixture and a growth promoting additive. The additive consists essentially of a synergistic mixture of an anabolic ingredient and a catabolic ingredient. The anabolic ingredient is vitamin A, vitamin E and/or vitamin T (Goetsch) while the catabolic ingredient is thyroxine. The anabolic ingredient is present in the feed in an amount of about 1 to 3.4 grams per ton of feed mixture, while the thyroxine is present in the feed in an amount exhibiting a biological activity corresponding to 15 to 25 milligrams of L-thyroxine per ton of feed mixture.

9 Claims, No Drawings

3,946,109

ANIMAL FEED COMPOSITION CONTAINING CERTAIN VITAMIN COMBINATIONS

CROSS-REFERENCE TO PRIOR APPLICATIONS

This is a continuation-in-part of copending application Ser. No. 386,545 filed Aug. 8, 1973, now abandoned, which in turn is a continuation of application Ser. No. 42,899 filed June 2, 1970, now abandoned, which in turn is a continuation-in-part of Ser. No. 656,051 filed July 26, 1967 and now abandoned.

FIELD OF INVENTION

The present invention is directed to an animal feed composition and, more particularly, it concerns a synergistic combination of an anabolic and a catabolic substance.

SUMMARY OF INVENTION

Hitherto, attempts have been made to provide a better regulation of the metabolism of animals which were fed with a view to growth control and accelerated gain in weight, by adding antibiotics to the customary feed. However, the results were not entirely satisfactory.

It is, therefore, an object of the present invention to provide a novel feed composition and an additive to feeds which afford improved results in animal feeding and higher gains in weight of the animals so fed at a faster rate.

Other objects and advantages of the composition according to the invention will become apparent from the following detailed description and the examples hereinbelow.

Briefly, the inventive additive for animal feed mixtures comprises a synergistic combination of catabolic and anabolic ingredients which are effective in growth and energy promotion. The combination consists essentially of at least one anabolic substance selected from the group consisting of vitamin A, vitamin E and vitamin T (Goetsch), in an amount of about 1 to 3.4 grams per ton of the total feed mixture, and thyroxine as the catabolic ingredient, said thyroxine being present in an amount exhibiting a biological activity corresponding to 15 to 25 milligrams of L-thyroxine per ton of total feed mixture.

In a preferred embodiment, the combination consists essentially of 10 million IU vitamin A, 50 milligrams vitamin E, and 25 milligrams of L-thyroxine.

In another preferred embodiment, the combination consists essentially of 6 million IU vitamin A, 30 milligrams vitamin E, and 15 milligrams of L-thyroxine.

Excellent results are obtained with a combination containing as the anabolic component between about 4 and 8 million IU of vitamin A per ton of total feed mixture plus 30 to 50 milligrams of vitamin E per ton of total feed mixture, and as the catabolic component thyroxine in an amount exhibiting a biological activity corresponding to 15 to 25 milligrams of L-thyroxine per ton of total feed mixture.

Very satisfactory growth promotion is also obtained with an additive comprising a combination of ingredients in growth and energy promotion, wherein the combination consists essentially of an anabolic and a catabolic component and containing as the anabolic component between about 4 and 18 million IU of vitamin A per ton of total feed mixture plus 10 to 200 grams of vitamin E per ton of total feed mixture, and as the catabolic component thyroxine in an amount exhibiting a biological activity corresponding to 10 to 50 milligrams of L-thyroxine per ton of total feed mixture.

The anabolic substance may consist of 4–10 million IU of vitamin A per ton of total feed mixture or of 4–10 million IU of vitamin A and 30–50 milligrams of vitamin E per ton of total feed mixture.

It has also been ascertained that the anabolic substance may consist essentially of about 4–10 million IU of vitamin A and 500–1500 g of vitamin T (Goetsch) per ton of total feed mixture.

In essence, therefore, the inventive animal feed comprises a conventional feed mixture and a growth promoting additive, the latter consisting essentially of a synergistic mixture of an anabolic ingredient and a catabolic ingredient, wherein the anabolic ingredient is one or several of vitamin A, vitamin E and vitamin T (Goetsch) and the catabolic ingredient is thyroxine. The anabolic ingredient is present in the feed in an amount of about 1 to 3.4 grams per ton of feed mixture, while the thyroxine is present in said feed in an amount exhibiting a biological activity corresponding to 15 to 25 milligrams of L-thyroxine per ton of feed mixture.

Generally speaking, the invention thus realizes the above-mentioned objects by providing a combination of ingredients, namely, thyroxine, some derivatives thereof having similar growth-promoting properties, or iodo-casein, in an amount corresponding to 1–1000 milligrams L-thyroxine per ton of total final feed, and one or several anabolic substances, such as vitamins A and E, certain hormones, polyhydroxy alcohols, anabolically active surfactants, or heavy metal salts, in a total amount of 1–500 grams per ton of total feed.

The effect of the feed composition according to the invention is based on an increase of the rate of growth with simultaneous improvement of the utilization of the feed by the animal's body. The effects noted are probably due to the following active principle, but it should be understood that the inventors do not intend to be held strictly to the interpretation set forth below.

The above-named growth-promoting substances are anabolic agents which in proper dosage behave in the metabolism like synthesis-promoting hormones with the difference that they do not possess any specific properties to influence some tissues, with the exception of the fat-soluble vitamins and the sex hormones. The last mentioned vitamins and sex hormones which do influence specific tissues in appropriate physiological dosage, extend their activity to all cells of the body when given in high doses so that, in that case too, the growth of the entire body is stimulated. The growth-accelerating effect of the above-mentioned compounds is connected with an increase of catabolic gland action (adrenal cortex and thyroid).

Studies on the biochemical activity of the hormones, disclosed as probable the principle underlying the effected changes: The growth-promoting substances limit the activity of a group of certain ferments, the flavine enzymes, of the large cell particles (mitochondria) which initiate catabolic cycles of the metabolism and final oxidation. The L-amino acid-oxidase, which has a preferred oxidizing action on essential amino acids, is inhibited to a high degree. As a consequence, there results a saving in that particularly important group of nutrients.

As a parallel phenomenon to the above, an inhibitory effect on the final oxidation is to be noted which is initiated by a flavine enzyme, which final oxidation appears to be indispensable for the energy supply of the cells. It was now found that the hormones of the adrenal cortex act as catalysts for the opposite reaction or, in other words, that they increase the activity of the same flavine enzymes. Thyroxine finally appears to stimulate the last step of the final oxidation, whereby energy supply is increased. The inhibition of the action of the flavine enzyme, which is necessary for the supply of energy, effects apparently of necessity an increased supply of the antagonistically acting hormone of the adrenal cortex, and leads at the same time to an increased output of the thyroid hormone. The anabolic effect of the growth-promoting substances results therefore principally in a shutdown of the regulatory of catabolic activities, particularly of the oxidation of essential amino acids, with a simultaneous rise in the thyroxine level which maintains the energy supply on a height required for growth processes.

Our investigations make it very probable that all growth-promoting substances are effective in accordance with the same principle. Therefore, a simultaneous thyroxine supply tends to compensate for the easily occurring inhibition of energy supply by intensification of the final oxidation. Thus, experience has proved that with simultaneous feeding of thyroxine, much better effects in growth are obtained than with exclusive feeding of a synthesis-promoting substance, because it permits control of the anabolic effect and, at the same time, the counter-regulating effect, which is difficult to control. Particularly in the second and third periods of feeding (intermediate and final periods) in which the growth-promoting effect is known to be excessively over-shadowed by the more active functioning of the adrenal cortex continually increasing with age (whereby gains in weight become smaller), the invention makes it possible to combine the anabolic and catabolic growth factors synergistically in such a way that growth acceleration will be steadily maintained to the end of the feeding, and may even be increased.

In the following, the invention will be more fully described in a number of examples where the feed composition was administered to certain animals, but it should be understood that these examples are given by way of illustration and not of limitation and the feed composition can be used as a general animal feed composition and is not limited to the animals mentioned in the examples. From these examples, the advantages of the feed combination according to the invention as compared to known additions will become clearly apparent.

EXAMPLE 1

A standard ration consisting of grain and soy bean groats and 5% by weight of fish meal, the protein contents of the ration being 16% by weight of raw protein, to which vitamins and minerals had been added for completing the composition, was fed to three groups of high-bred pigs.

The feed for the animals of group 1 remained without addition (control). The ration of group 2 contained 10 grams chlorotetracyclin per ton, and the ratio of group 3, 25 milligrams L-thyroxine and 10 million IU vitamin A plus 50 milligrams vitamin E per ton of final feed. For the intermediate and final feed periods the contents of vitamin A was decreased to 4 million IU per ton. The feeding was so conducted that the troughs were completely emptied from one feeding to the next one. Gain in weight and other data will be seen from Table 1 below.

Table 1

| Feeding Period | Group | Total Gain in kg | Daily Gain per Animal in g | Increased Gain as compared to Group 1 in % | Feed Consumption kg | Feed efficiency | Feed efficiency % better as compared to Group 1 |
| --- | --- | --- | --- | --- | --- | --- | --- |
| Initial Period (20-40 kg body weight) 37 feeding days | 1 | 17.9 | 483 | — | | | |
| | 2 | 18.6 | 503 | +4 | | | |
| | 3 | 19.6 | 530 | +10 | | | |
| Intermediate period (40-70 kg body weight) 39 feeding days | 1 | 22.3 | 573 | — | | | |
| | 2 | 23.3 | 598 | +4.5 | | | |
| | 3 | 25.7 | 660 | +15 | | | |
| Final Period (70-100 kg weight) 21 feeding days | 1 | 12.4 | 593 | — | | | |
| | 2 | 13.9 | 665 | +12 | | | |
| | 3 | 14.7 | 701 | +18 | | | |
| Total Average 97 feeding days | 1 | 52.6 | 541 | — | 193.5 | 3.68 | — |
| | 2 | 55.8 | 575 | +6.5 | 194.1 | 3.48 | +5.5 |
| | 3 | 60.0 | 618 | +14 | 202.5 | 3.36 | +9.2 |

The table shows that the combination of the effective substances of L-throxine, Vitamin A and Vitamin E used according to the invention increases the rate of growth to a higher degree than an addition of 10 grams chlorotetracyclin per ton of total feed.

EXAMPLE 2

In this example, a basic ration of the following composition was fed to three groups of 40 male chickens of the race Nichols-Lohmann, one day old at the start. Weighings were made after 4 and 8 weeks of feeding.

COMPOSITION OF DIET

| | |
| --- | --- |
| 50% by weight of corn groats | 1% by weight of fish solubles |
| 1% by weight of oat meal | 1% by weight of fish meal |
| 6% by weight of beef suet | 2.5% by weight of dicalcium phosphate |
| 35% by weight of soy groats | 1% by weight of calcium carbonate |
| 2% by weight of Anilac | 0.4% by weight of iodated NaOl |
| (partly de-sugared whey powder) | | plus 1% by weight of premixed vitamins, imparting to 1 kg of final feed the following vitamins:

3000 IU vitamin A
1000 IU vitamin D
5 mg - tocopherol
1 mg vitamin K
3 mg Riboflavin 10 mg vitamin $B_{12}$
5 mg Ca-Pantothenate
300 mg nicotinic acid
20 mg manganese sulfate
1 g D, L-Methionin See Table II below, which shows that in the case of chickens too, the combination according to the invention added to conventional feed materials improves the rate of growth to a much higher degree.

out with 5 repetitions on 6 animals each. The basic feed, of which there was an unlimited amount—which also applies to water—, was composed as follows:

45% of wheat groats
35% of corn groats
15% of soya groats
3% skim milk powder
2% raw flour of alfalfa
2% mineral mix containing:
    "40% calcium carbonate compound
    (usually called "feed lime"
    30% calcium phosphate Table 2

| Group | Weight at Start in g | Animal Weight after 4 weeks in g | Animal Weight after 8 weeks in g | Increased Gain as compared to Group 1 | Feed efficiency | Feed efficiency % better as compared to Group 1 |
|---|---|---|---|---|---|---|
| 1 - Basic ration without additive | 47 | 581 | 1324 | — | 2.09 | — |
| 2 - Basic ration plus penicillin 5 g/t | 48 | 606 | 1358 | +3 | 2.01 | +4.5 |
| 3 - Basic ration plus 15 mg L-thyroxine, 6 million IU vitamin A and 30 mg viatmin E per ton | 46 | 623 | 1452 | +10.5 | 1.83 | +12.5 |

It should be noted with regard to the example provided herein, that 10 million IU vitamin A equals 3.3 grams.

EXAMPLE 3

5 groups of 30 rats each (Sprague-Dawley males) were fed with a conventional feed and different active additives for 23 days. Each group of tests was carried out with 5 repetitions on 6 animals each.

24.5% salt for animals
5% magnesium phosphate
0.5% trace elements
(mostly as sulphates)
(Fe:Cu:Mn:Co=5:1.5:1:2)

All animals had a weight of 40 grams to start with and were weighed weekly. The results are shown in the following table.

Table 3

| Test No. | Additive | Increase in weight g | n* | s** | % Change of weight |
|---|---|---|---|---|---|
| 1 | Vitamin A 2 Million IU/t | 67.5 | 30 | 2.3 | |
| 2 | Vitamin A 10 Million IU/t | 70.9 | 30 | 2.1 | +5,0 |
| 3 | Vitamin A 2 Million IU/t+ Vitamin T (Goetsch)*** 1.5 kg/t | 71.6 | 30 | 2.7 | +5,9 |
| 4 | Vitamin A 2 Million IU/t+ L-Thyroxine 25 mg/t | 63.8 | 30 | 5.4 | −5,4 |
| 5 Vi | Vitamin A 10 Million IU/t+ L-Thyroxine 25 mg/t | 77.9 | 30 | 1.7 | +15,3 |
| 6 | Vitamin A 2 Million IU/t+ Vitamin T (Goetsch) 1.5 kg/t+ L-Thyroxine 25 mg/t | 76.4 | 30 | 1.9 | +13,1 |
| 7 | Vitamin A 4 Million IU/t+ Vitamin E 10g/t L-Thyroxin 10 mg/t | 71.3 | 30 | 2.6 | +5,8 |
| 8 | Vitamin A 10 Million IU/t Vitamin E 100 g/t L-Thyroxin 25 mg/t | 79.1 | 30 | 2.0 | +17,4 |
| 9 | Vitamin A 20 Million IU/t Vitamin E 200g/t | | | | |

Table 3-continued

| Test No. | Weight change in rats with various active agents added Test Period: 23 days to feed | | | |
|---|---|---|---|---|
| | Additive | Increase in weight g | n* s** | % Change of weight |
| | L-Thyroxin 30 mg/t | 72.8 | 30 2.9 | +7.9 |

*n = Total number of animals per group
**s = Deviation from standard
*** = Vitamin T (Goetsch) has about the same effect is admixed to 500 g/t.

The dosages used in the tests with rats can be directly applied to pigs as well as other animals.

When chickens are tested it is preferable if the quantity of thyroxine is reduced to 15 mg/ton. The vitamin A equivalent of 4 million IU/ton may be replaced by other anabolics.

With regard to the test results tabulated above and particularly in the Table 3, the following explanation is considered to be helpful. It should be borne in mind that the vitamin requirement, as such, must be provided, that is to say a minimum requirement must be present in the feed, before any anabolic or catabolic activity can be observed. Of Vitamin A, for instance, the minimum requirement is 4 million units per ton of feed. Only a surplus of the vitamin above the minimum requirement can exhibit any anabolic activity at all. In Table 3 this can be noted from test 1. It is also clearly shown when tests 4 and 5 are compared. In test 4, only the minimum requirement in Vitamin A is present and this does not cause any anabolic activity. Thus, in test 4, the catabolic activity of L-thyroxine is dominant. However, by an increase of the Vitamin A addition to an anabolically active amount, thyroxine is shown to bring about a surprising rise in change of weight (test 5). Test 6 shows that Vitamin A can be replaced by Vitamin T (Goetsch) with similar results.

With similar results one could replace the surplus quantity of Vitamin A by the other anabolics mentioned previously.

Therefore, from the tabulated tests it appears that Vitamins A and Vitamin T cause only a low increase in the rate of growth. Further, the tests indicated that thyroxine in itself acts catabolically, however, it appreciately boosts the rate of growth when used in combination with anabolic substances.

Further tests have shown that the figures for the addition of vitamin A and E respectively, and for L-thyroxine per ton of feed for a variety of domesticated animals is as follows:

a combination of  4 to 20 million IU vitamin A,
                  10 to 200 grams vitamin E, and
                  10–50 milligrams L-thyroxine,
and another combination of
                  4–20 million IU vitamin A
                  10–50 grams vitamin E, and
                  10–30 milligrams L-thyroxine.

Accordingly, it can be appreciated from the test results in Table 3 that by combining the normally catabolically acting thyroxine with one or more anabolic substances in excess of the minimum vitamin requirement, a synergistic effect in the growth-promoting results is obtained which the anabolic substances are incapable of producing by themselves.

While the individual ingredients of the inventive additive are, of course, known per se and have indeed been used in animal feeds, it should be recognized that it has not previously been attempted to combine anabolic and catabolic substance for growth promotion. For the following reasons such combination would not normally be employed and the inventive results are thus surprising and unexpected:

The inventive mixture comprises anabolic and catabolic ingredients, the anabolic ingredient or substances being vitamin A, vitamin E and/or vitamin T (Goetsch) while the catabolic ingredient is thyroxine, the ingredients being used in stated amounts and ratios. On first glance it would appear to be contradictory to combine anabolic substances with catabolic substances since it could be reasonably expected that the catabolic substance would negate the effect of the anabolic substance. However, as will be shown, this is not the case.

The premise for the present invention is that an increase in the growth speed is desired. For this purpose it would be obvious to use an anabolic substance since it is known that anabolic substances facilitate the synthesis of new tissue. However, it is also known that a catabolic substance causes exactly the opposite effect and accordingly a person skilled in this art would reasonably consider it injurious or even non-sensical to add to a feed mixture a catabolic substance if it is desired to obtain increased growth. The viewpoint that a catabolic substance decomposes tissue rather than forming it is basically correct. This is where the invention sets in because only in the concentrations for the catabolic substance as taught in the present invention is there obtained an effect which, in conjunction with the anabolic substance, is a synergistic effect, which causes an increase in the growth speed. This synergistic effect is thus most surprising and unexpected. It is believed that this surprising effect is due to the fact that the so-called "recoupling effect" of the stimulation of the thyroid by thyroxine does not take place if the amount of thyroxine as set forth herein is adhered to. This is so because the indicated amounts for the catabolic substance are below the concentration necessary for the "recoupling", in which the thyroid decreases its thyroxine production or ceases such production altogether. Since the invention operates with an amount of thyroxine which is below this concentration boundary for the recoupling, the result is in essence the same as if there would be increased thyroid function. This increased thyroid function in combination with the supply of anabolic substances leads to the observed significantly increased speed in growth. According to the known state of science, a decrease in the speed of growth due to the addition of thyroxine in conjuction with an anabolic component would have been expected. The surprising effect which is obtained if the concentrations as recited herein are adhered to is particularly clearly demonstrated by the results tabulated in Table 3 wherein the growth promoting anabolic substance is used in various concentrations both alone and in conjunction with a normally growth inhibiting, to wit, catabolic substance. It will be noted from Table 3 that the best results are obtained by the combination of anabolic and catabolic substance within the indicated quantity values (see tests 5, 6 and 8). The increase in growth by contrast was considerably less if the anabolic substance alone or the anabolic substance in combination with catabolic substance in an amount outside the indicated weight ranges were used.

What is claimed is:

1. An additive for animal feed mixtures, said additive comprising a synergistic combination of catabolic and anabolic ingredients effective in growth and energy promotion, the combination consisting essentially of an anabolic substance selected from the group consisting of vitamin A, vitamin E and vitamin T (Goetsch), in an amount of about 1 to 3.4 grams per ton of the total feed mixture, and thyroxine as the catabolic ingredient, said thyroxine being present in an amount exhibiting a biological activity corresponding to 15 to 25 milligrams of L-thyroxine per ton of total feed mixture.

2. An additive for animal feed mixtures, as set forth in claim 1, wherein the combination consists essentially of 10 million IU vitamin A, 50 milligrams vitamin E, and 25 milligrams of L-thyroxine.

3. An additive for animal feed mixtures, as set forth in claim 1, wherein the combination consists essentially of 6 million IU vitamin A, 30 milligrams vitamin E, and 15 milligrams of L-thyroxine.

4. An additive for animal feed mixtures, said additive comprising a combination of ingredients effective in growth and energy promotion, the combination consisting essentially of an anabolic and a catabolic component and containing as the anabolic component between about 4 and 8 million IU of vitamin A per ton of total feed mixture plus 30 to 50 milligrams of vitamin E per ton of total feed mixture, and as the catabolic component thyroxine in an amount exhibiting a biological activity corresponding to 15 to 25 milligrams of L-thyroxine per ton of total feed mixture.

5. An additive for animal feed mixtures, said additive comprising a combination of ingredients effective in growth and energy promotion, the combination consisting essentially of an anabolic and a catabolic component and containing as the anabolic component between about 4 and 18 million IU of vitamin A per ton of total feed mixture plus 10 to 200 grams of vitamin E per ton of total feed mixture, and as the catabolic component thyroxine in an amount exhibiting a biological activity corresponding to 10 to 50 milligrams of L-thyroxine per ton of total feed mixture.

6. An additive as claimed in claim 1, wherein the anabolic substance consists essentially of 4–10 million IU of vitamin A per ton of total feed mixture.

7. An additive as claimed in claim 1, wherein the anabolic substance consists essentially of 4–10 million IU of vitamin A and 30–50 milligrams of vitamin E per ton of total feed mixture.

8. An additive as claimed in claim 1, wherein the anabolic substance conssists essentially of about 4–10 million IU of vitamin A and 500–1500 g of vitamin T (Goetsch) per ton of total feed mixture.

9. An animal feed comprising a conventional feed mixture and a growth promoting additive, said additive consisting essentially of a synergistic mixture of an anabolic ingredient and a catabolic ingredient, said anabolic ingredient being selected from the group consisting of vitamin A, vitamin E and vitamin T (Goetsch) and said catabolic ingredient being thyroxine, said anabolic ingredient being present in said feed in an amount of about 1 to 3.4 grams per ton of feed mixture, while said thyroxine is present in said feed in an amount exhibiting a biological activity corresponding to 15 to 25 milligrams of L-thyroxine per ton of feed mixture.

* * * * *